G. W. SPONABLE.
CHUCK FOR CENTERING AND HOLDING GEARS.
APPLICATION FILED MAY 20, 1911.
1,056,954.
Patented Mar. 25, 1913.
2 SHEETS—SHEET 1.
Fig-1-
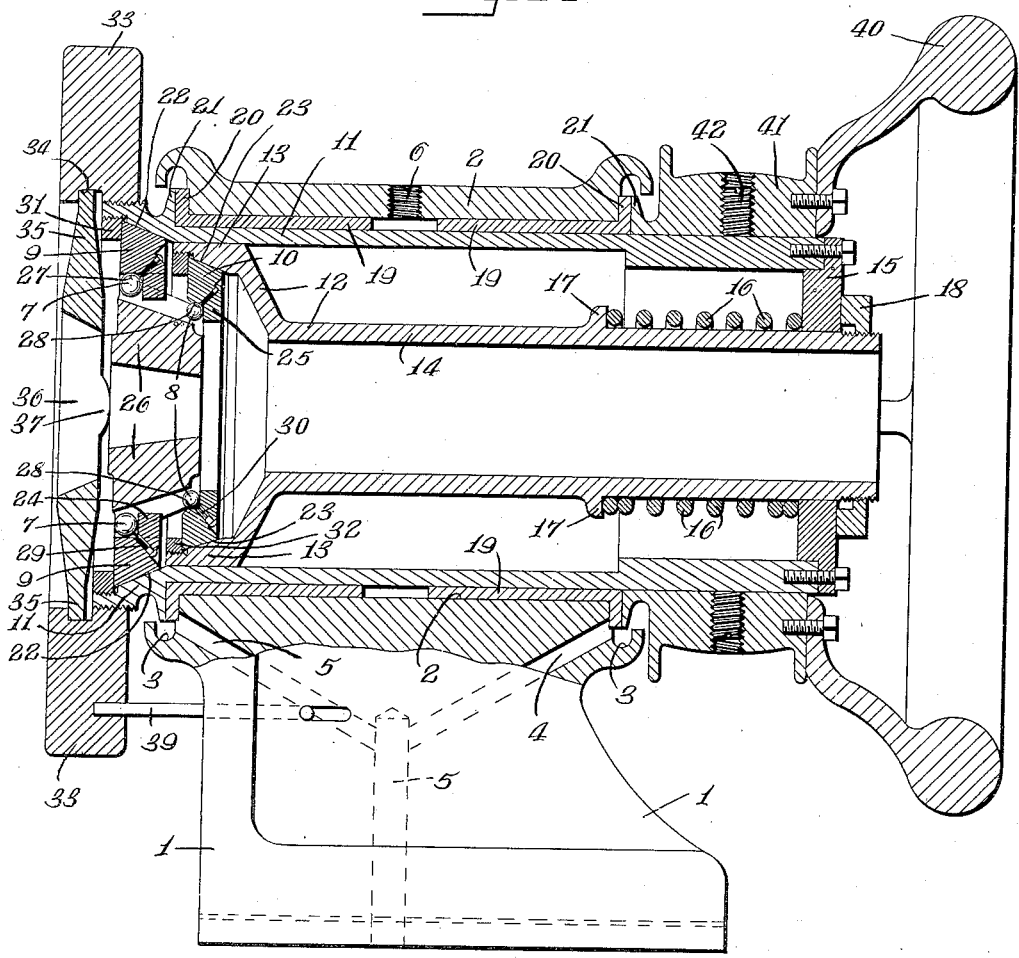
Fig-4-
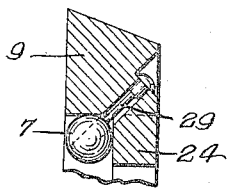
WITNESSES:
Chas H Young
J. B. Smith
INVENTOR
George W. Sponable
BY
Parsons Hall & Bruce
ATTORNEYS.

G. W. SPONABLE.
CHUCK FOR CENTERING AND HOLDING GEARS.
APPLICATION FILED MAY 20, 1911.

1,056,954.

Patented Mar. 25, 1913.
2 SHEETS—SHEET 2.

WITNESSES:

INVENTOR
George W. Sponable
BY
ATTORNEYS

UNITED STATES PATENT OFFICE.

GEORGE W. SPONABLE, OF SYRACUSE, NEW YORK, ASSIGNOR TO BROWN-LIPE GEAR COMPANY, OF SYRACUSE, NEW YORK, A CORPORATION OF NEW YORK.

CHUCK FOR CENTERING AND HOLDING GEARS.

1,056,954.     Specification of Letters Patent.     Patented Mar. 25, 1913.

Application filed May 20, 1911. Serial No. 628,412.

*To all whom it may concern:*

Be it known that I, GEORGE W. SPONABLE, of Syracuse, in the county of Onondaga and State of New York, have invented a certain new and useful Chuck for Centering and Holding Gears, of which the following is a specification.

My invention has for its object the production of a chuck for centering and holding gears which is particularly simple in construction and highly efficient and durable in use, and it consists in the combinations and constructions hereinafter set forth and claimed.

In describing this invention reference is had to the accompanying drawing in which like characters designate corresponding parts in all the views.

Figure 2:
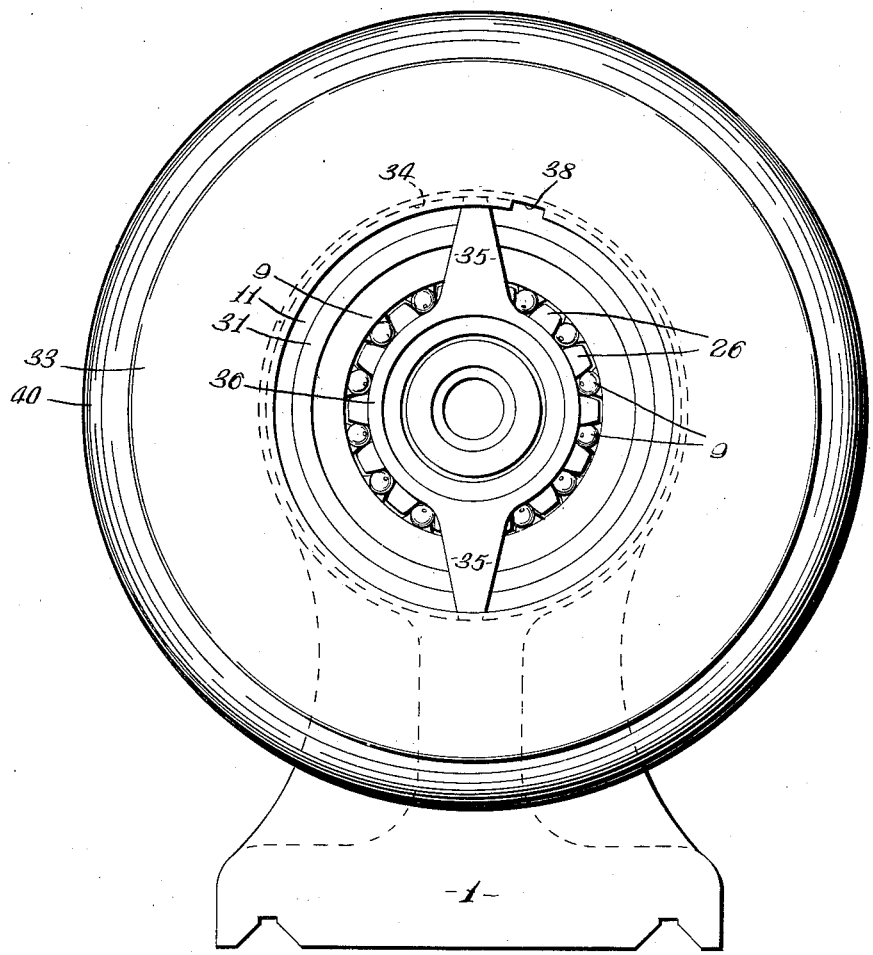
Figure 3:
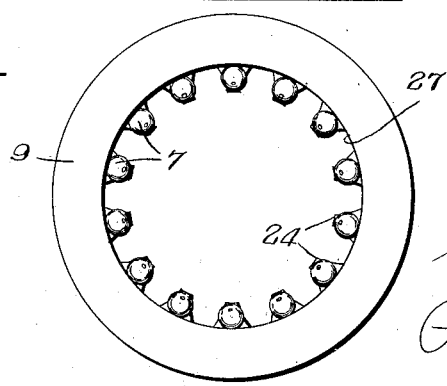

Figure 1 is a sectional view, partly in elevation, of a chuck embodying one form of my invention. Fig. 2 is an end view thereof. Fig. 3 is an end elevation of one of the supporting rings and contiguous parts; and Fig. 4 is a fragmentary view thereof.

This chuck, comprises, generally, two sets of clamping devices or members for entering spaces between teeth of the gear to be centered and held, and means for forcing the clamping members into engagement with the faces of the teeth.

The chuck here illustrated is designed for centering and holding bevel gears which are to be operated on or machined as for instance, to have axial holes bored therein, and it comprises a body, two annular sets of clamping members concentric with a common axis, that is, the axis of the chuck, the members of one set being paired with those of the other, and the members of each pair being spaced apart in a direction axially of the chuck and disposed in a plane radial to such axis and located different distances from such axis, and one set of members being movable axially, as one body, toward and from the other.

The chuck also comprises means for supporting the annular sets of clamping members respectively, the means supporting one set being movable with and also relatively to the means for supporting the other set, during the tightening of the clamping members on the gear.

In the illustrated embodiment of my invention the body of the chuck includes a base 1 and a bearing 2 mounted on the base and extending transversely thereof, the base 1 being provided at its ends with suitable oil gutters 3 and with oil passages 4 leading from the gutters to a main oil outlet passage 5. The bearing 2 is provided at its upper side with an inlet 6 for connection with a suitable oil cup, not shown.

The annular sets of clamping members 7 and 8 are here shown as supported respectively by carriers comprising supporting rings 9 and 10 which are mounted in and movable with suitable supporting elements, one element being in the form of a barrel 11 rotatable in the bearing 2 and projecting beyond the ends of the same and the element 12 being located within the barrel 11 and having a head 13 at its front end, the periphery of which engages the inner face of the barrel 11, and a stem 14 extending axially of the barrel 11, and through a head 15 at the rear end of the barrel. The supporting rings are carried at the front end of the barrel 11 and head 13, and the barrel 11 is provided with operating means at its rear end. The inner carrier is slidable axially of the outer carrier 11 against the action of a spring 16 encircling the stem 14 of the inner carrier and interposed between an annular shoulder 17 on said stem and the inner face of the head 15 of the barrel 11. Axial movement of the carrier 12 by the spring is limited by an adjustable shoulder as a nut 18 threading on the outer or rear end of the stem 14 and coacting with the outer face of said head 15. Usually bushings or sleeves 19 encircle the barrel 11 within the bearings 2, said sleeves having annular flanges 20 at their outer ends interposed between the end faces of the bearings 2 and peripheral shoulders 21 fixed relatively to said barrel 11, which shoulders hold the barrel from endwise movement. The inner ends of the bushings or sleeves 19 are spaced apart forming an oil groove into which the inlet 6 of the bearing 2 opens.

The supporting rings 9, 10 are provided respectively with conical or beveled peripheral faces 22, 23 fitting into internal conical or beveled faces provided respectively on the front end of the barrel 11 and the head of the inner carrier 12, each of these rings 9, 10 having a series of internally extending lugs 24, 25 similar to the teeth of an internal gear, and alined with the spaces between teeth of the gear 26 held by the chuck, the front faces of the lugs 24 or 25 meeting the internal circumferential faces 27, 28 of the rings 9, 10, such front faces of the lugs and faces 26 or 27 forming bearings for the clamping members 7 or 8 which are usually balls, the balls 8 being of smaller diameter than the balls 7. The balls 7 and 8 are yieldingly and independently supported by resilient stems 29, 30 extending into inclined passages formed respectively in the rings and opening through the angles or lines of meeting of the front faces of the lugs 24 and 25 and the faces 27 and 28.

The supporting rings 9, 10 are held in position by suitable threaded retaining rings 31, 32 threading into the front ends respectively of the barrel 11 and head 13 of the carrier 12.

The gear 26 to be centered and held, is held from movement when engaged by the balls 7, 8 by a suitable retaining member 33 in the form of an annulus threading on the front end of the sleeve or carrier 11 and formed with an internal annular groove 34 for receiving radially extending arms 35 of a gear engaging member or device 36 which is provided with shoulders 37 for engaging the front face of the gear 26 at diametrically opposite points, the front wall of the groove 33 being provided with a slot 38 for permitting the arms 35 to be placed into the groove 34, in position to be interlocked in the groove by a partial turning of the engaging member 36. The balls 7 and 8 are placed in engagement with the teeth of the gear by moving the annulus 33 and the carriers 11, 12 for the balls, axially relatively to each other and either the annulus 33 may be turned onto the barrel by holding the carrier from movement and turning the annulus, or the annulus may be held and the carrier rotated. The latter method is preferable to the former, and therefore the annulus 33 is provided with means for holding the same from turning with the barrel and the barrel 11 is provided with means for turning the same by hand.

The means for preventing the turning of the annulus 33 comprises a stop 39 carried by the base and movable into and out of engagement with the annulus 33.

The means for turning the barrel 11 comprises a hand wheel 40 mounted on the rear end of the barrel 11, said hand wheel being connected directly to a pulley 41 encircling the barrel 11 outside of the bearing 2, and keyed thereto by screws 42. Said pulley is designed for connection with a suitable power wheel for rotating the carrier of the chuck after the gear 26 is centered and held and a suitable boring tool has been placed in position to operate during the turning of the chuck.

In operation the gear engaging member 36 is removed and the gear 26 inserted in the chuck so that the clamping members or balls 7, 8 enter between teeth of the gear. The member 36 is then placed in position and the stop 39 shifted into position to hold the annulus 33 from movement. The hand wheel 40 is then turned causing the annulus 33 to move axially inwardly pressing the gear 26 inwardly so that the balls 7 and 8 are tightly engaged with the faces of the teeth of the gear. The stems 29, 30 of the balls 7, 8 yield so that the balls can adjust themselves independently to the teeth of the gear and also the inner carrier 12 moves axially against the action of the spring 16 in order to adjust the series of balls 8 to the increasing diameter of the bevel gear 26, as said gear is forced inwardly. After the gear has been centered and held, the stop 39 is moved out of operative position and the power applied to the pulley 41.

What I claim is:

1. In a chuck for centering and holding gears, two sets of independently movable clamping members for engaging faces of teeth of the gear held in the chuck, means for forcing the clamping members into engagement with said teeth, and means for forcing the work held in the chuck into engagement with the clamping members, substantially as and for the purpose described.

2. In a chuck for centering and holding gears, two sets of independently movable clamping members for engaging the faces of the teeth of the gear held by the chuck, said sets being separated unequal distances from the axis of the chuck, and means acting against the work in a direction axially of the chuck and toward the clamping members, substantially as and for the purpose specified.

3. In a chuck for centering and holding gears, two sets of independently movable clamping members for engaging the faces of the teeth of the gear held in the chuck, the clamping members of one set being of less diameter than those of the other set, and being separated a less distance from the axis of the chuck than the members of the other set, and means for forcing the work into engagement with the clamping members, substantially as and for the purpose set forth.

4. In a chuck for centering and holding gears, two sets of clamping members for engaging teeth of the gear held in the chuck, the members of one set being paired with the members of the other, and the members of said pairs being spaced apart and arranged in planes radial to the axis of the chuck and being separated unequal distances from said axis, and means acting on the gear for forcing the gear axially, substantially as and for the purpose described.

5. In a chuck for centering and holding gears, a set of clamping members for engaging the faces of teeth of the gear held in the chuck, a second set of clamping members for engaging said teeth, and being movable axially relatively to the first set of clamping members, means acting on the gear to force the same axially within said sets, substantially as and for the purpose specified.

6. In a chuck for centering and holding gears, a set of clamping members for engaging the faces of teeth of the gear held in the chuck, a second set of clamping members for engaging said teeth, the members of the sets having spherical portions, and the spherical portions of the members of one set being of less diameter than the spherical portions of the members of the other set and being separated a less distance from the axis of the chuck, and means for forcing the gear toward said members, substantially as and for the purpose set forth.

7. In a chuck for centering and holding gears, two sets of independently movable clamping members for engaging the faces of teeth of the gear held in the chuck, said members being capable of a limited yielding movement laterally to enter the spaces between said teeth and center the gear, and means for holding the clamping members and the gear in engagement, substantially as and for the purpose described.

8. In a chuck for centering and holding gears, two sets of independently movable clamping members for engaging the faces of teeth of the gear held in the chuck, the members of said sets being separated unequal distances from the axis of the chuck, and the members of both sets being capable of a limited yielding movement laterally to fit between said teeth and thereby center the gear, and means for holding the clamping members and the gear in engagement, substantially as and for the purpose specified.

9. In a chuck for centering and holding gears, two sets of independently movable clamping members for engaging teeth of the gear held in the chuck, the clamping members of one set being of less diameter than those of the other set and the members thereof being separated a less distance from the axis of the chuck than the members of the other set and the members of both sets being mounted to have a limited yielding movement laterally to fit between the spaces of said teeth and to center the gear, and means for forcing the clamping members and the gear into engagement, substantially as and for the purpose set forth.

10. In a chuck for centering and holding gears, a set of clamping members for engaging the faces of the teeth of the gear held in the chuck, a second set of clamping members for engaging said teeth and being movable toward and from the first set of clamping members, the members of the sets having spherical engaging portions, and the spherical portions of one set being of less diameter than the spherical portions of the members of the other set and being separated a less distance from the axis of the chuck, and the clamping members having a limited yielding movement laterally to enter the spaces between the teeth and to center the gear, and means for holding the clamping members and the gear in engagement, substantially as and for the purpose described.

11. In a chuck for centering and holding gears, two sets of clamping members for engaging the faces of teeth of the gear in the chuck, each of said members having substantially spherical engaging surfaces, and the members of one set being of less diameter than those of the other and being separated a less distance from the axis of the chuck than said other set, and means for forcing the clamping members into engagement with the teeth of the gear, substantially as and for the purpose described.

12. In a chuck for centering and holding gears, a set of clamping members for engaging the faces of teeth of the gear held in the chuck, and a second set of clamping members for engaging said teeth and movable toward and from the first set of clamping members, and means for holding the clamping members in engagement with the teeth of the gear, substantially as and for the purpose described.

13. In a chuck for centering and holding gears, a set of clamping members for engaging the faces of teeth of the gear held in the chuck, a second set of clamping members for engaging said teeth and movable toward and from the first set of clamping members, the members of one of said sets being of less diameter than those of the other and being separated a less distance from the axis of the chuck, and means for holding the clamping members in engagement with the teeth of the gear, substantially as and for the purpose specified.

14. In a chuck for centering and holding gears, a set of clamping members for engaging the faces of teeth of the gear held in the chuck, a second set of clamping members for engaging said teeth and movable as one body toward and from the first set of clamping members, the members of one of said sets being of less diameter than those of the other and being separated a less distance from the axis of the chuck, and means for holding the clamping members in engagement with the teeth of the gear, substantially as and for the purpose set forth.

15. In a chuck for centering and holding gears, a set of movable clamping members for engaging teeth of the gear held in the chuck, a rotatable carrier for said members, means for rotating the carrier, a second set of clamping members for engaging teeth of the gear, a second carrier therefor having movement with, and relatively to, the first-named carrier, and means operating the carriers to hold the clamping members in engagement with the gear, substantially as and for the purpose described.

16. In a chuck for centering and holding gears, a set of clamping members for engaging teeth of the gear held in the chuck, a rotatable carrier for said members, means for rotating said carrier, a second set of clamping members, a carrier therefor movable relatively to the first-named carrier, a spring interposed between the carriers, and means for holding the gear in engagement with the clamping members, substantially as and for the purpose specified.

17. In a chuck for centering and holding gears, an annular set of independently-movable engaging members concentric with the axis of the chuck, and a second annular set of independently movable clamping members concentric with said axis, and spaced apart from the first set, and the members of the second set being separated less distance from the axis of the chuck than the members of the first set, and means for holding the gear in engagement with the clamping members, substantially as and for the purpose set forth.

18. In a chuck for holding and centering gears, a set of independently-movable clamping members for engaging teeth of the gear held in the chuck, a rotatable carrier for said members, means for rotating the carrier, a second set of clamping members, a carrier therefor movable axially of the first carrier, a spring tending to move the last-named carrier to the limit of its movement in one direction, and means for holding the gear in engagement with the clamping member, substantially as and for the purpose described.

19. In a chuck for centering and holding gears, a set of independently-movable clamping members for engaging teeth of the gear held in the chuck, a rotatable carrier for said members, means for rotating the carrier, a second set of clamping members, a carrier therefor movable axially of the first-named carrier, a spring tending to move said second carrier to the limit of its movement in one direction, means for arresting the movement of the spring pressed carrier under the influence of its spring, and means for holding the gear in engagement with the clamping members, substantially as and for the purpose specified.

20. In a chuck for centering and holding gears, independently-movable clamping members for engaging teeth of the gear held in the chuck, a rotatable carrier for said members, means for rotating the carrier, and gear-clamping means supported by the carrier, one of the two last-named elements being movable axially relatively to the other, substantially as and for the purpose set forth.

21. In a chuck for centering and holding gears, independently-movable clamping members for engaging teeth of the gear held in the chuck near one end of the gear, a carrier for said members having an end portion exteriorly threaded, a gear retaining member screwing upon said threaded end of the carrier and a second set of clamping members engaging the teeth of the gear near the opposite end thereof, substantially as and for the purpose described.

22. In a chuck for centering and holding gears, independently-movable clamping members for engaging teeth of the gear held in the chuck, a carrier for said members having an end portion exteriorly threaded, and a gear retaining member screwing upon said threaded end of the carrier, said retaining member comprising an annulus having a channel in its inner circular face, and a gear-engaging member having parts retained in said channel, substantially as and for the purpose specified.

23. In a chuck for centering and holding gears, independently-movable clamping members for engaging teeth of the gear held in the chuck, a carrier for said members having an end portion exteriorly threaded, and a gear retaining member screwing upon said threaded end of the carrier, said member comprising an annulus having a channel in its inner portion, and a gear-engaging member having a circular part provided with contact surfaces and radially extending arms held at their ends in said channel, substantially as and for the purpose set forth.

24. In a chuck for centering and holding gears, independently-movable clamping members for engaging teeth of the gear held in the chuck, a carrier for said members comprising a supporting ring and a barrel, said barrel having an internal seat for the supporting ring, and a retaining device for holding the ring and barrel together, and said supporting ring being provided with an inwardly projecting lug of less diameter than the thickness of the ring from front to rear thereof, the front faces of the lugs and the contiguous inner circular face of the supporting ring providing bearing surfaces for the clamping members, and means for retaining the gear in engagement with the clamping members, substantially as and for the purpose described.

25. In a chuck for centering and holding gears, a set of independently-movable clamping members for engaging opposing faces of the teeth of the gear held in the chuck, and a carrier for such members comprising a supporting ring having a beveled periphery and a barrel having a beveled surface complemental to and engaging the beveled periphery of the ring, means for holding the supporting ring seated against the beveled surface of the barrel, and retaining devices for the clamping members secured in the supporting ring, substantially as and for the purpose specified.

26. In a chuck for centering and holding gears, a set of independently-movable clamping members for engaging teeth of the gear held in the chuck, a carrier for such members comprising a barrel and a supporting ring having inwardly extending lugs spaced a distance apart and being of less thickness than the thickness from front to rear of the ring, the front faces of the lugs and the contiguous inner circular face of the supporting ring providing bearing surfaces for the clamping members, and said ring being formed with inclined passages opening through the angles of the bearing faces, means for holding the ring to the barrel, and pins individual to the clamping members held in the openings in the supporting ring, substantially as and for the purpose set forth.

27. In a chuck for centering and holding gears, a set of independently-movable clamping members for engaging teeth of the gear held in the chuck, a carrier for such members comprising a barrel and a supporting ring having inwardly extending lugs spaced a distance apart and being of less thickness than the thickness from front to rear of the ring, the front faces of the lugs and the contiguous inner circular face of the supporting ring providing bearing surfaces for the clamping members, and said ring being formed with inclined passages opening through the angles of the bearing faces, means for holding the ring to the barrel, and pins individual to the clamping members held in the openings in the supporting ring, the pins fitting the openings loosely whereby the clamping devices are capable of limited movements relative to the bearing surfaces therefor, substantially as and for the purpose described.

28. In a chuck for centering and holding gears, a body having a bearing, a carrier journaled in the bearing and comprising a supporting ring and a barrel having its ends projecting from the bearing, means at one end of the barrel for rotating the same, means at the opposite end of the barrel for retaining the supporting ring therein, independent clamping members carried by the supporting ring, and a gear retaining device adjustably mounted on the carrier, substantially as and for the purpose specified.

29. In a chuck for centering and holding gears, a body having a bearing, a carrier journaled in the bearing and comprising a supporting ring and a barrel having its ends projecting from the bearing, means at one end of the barrel for rotating the same, means at the opposite end of the barrel for retaining the supporting ring therein, independent clamping members carried by the supporting ring, a gear-retaining device adjustably mounted on the carrier, and a second set of clamping members arranged within said carrier, substantially as and for the purpose set forth.

30. In a chuck for centering and holding gears, a body having a bearing, a carrier comprising a supporting ring and a barrel journaled in said bearing and having its ends projecting from the bearing, means at one end of the barrel for rotating the same, independent clamping members at the opposite end of the barrel for engaging teeth of a gear, and a gear-retaining device adjustably mounted on the carrier, substantially as and for the purpose described.

31. In a chuck for centering and holding gears, a body having a bearing, a carrier comprising a supporting ring and a barrel journaled in said bearing and having its ends projecting from the bearing, means at one end of the barrel for rotating the same, independent clamping members at the opposite end of the barrel for engaging teeth of a gear, a gear retaining device adjustably mounted on the carrier, and a second set of clamping members arranged within said carrier, substantially as and for the purpose specified.

32. In a chuck for centering and holding gears, a body having a bearing, a carrier journaled in the bearing and comprising a barrel having its ends projecting from the bearing, means for rotating the barrel at one end thereof, a supporting ring at the opposite end of the barrel, independent clamping members carried by the supporting ring, a gear retaining device adjustably mounted on the carrier, and a second set of clamping members arranged within said carrier, substantially as and for the purpose set forth.

33. In a chuck for centering and holding gears, a set of clamping members for engaging teeth of the gear held in the chuck, a carrier therefor comprising a barrel supporting said members at one end and having a head at its opposite end, a second set of clamping members, a carrier therefor comprising a tubular member having a head at one end supporting the second set of clamping members, and a stem extending through the head of the barrel, and means on said stem tending to press the second set of clamping members toward the first set, substantially as and for the purpose described.

34. In a chuck for centering and holding gears, a body having a bearing, a set of clamping members for engaging teeth of the gear held in the chuck, a carrier journaled in the bearing comprising a barrel supporting said members at one end and having a head at its opposite end, means on the barrel for rotating the same, a second set of clamping members, a carrier therefor including an element having a head at one end supporting said second set of clamping members, and a stem portion extending axially of the barrel and through the head thereof, the stem portion being provided with a peripheral shoulder spaced apart from the head of the barrel, and a threaded portion in the rear of said head, a spring interposed between the head and said shoulder, a nut screwing on said threaded portion and coacting with the head of the barrel, and means for holding the gear in engagement with the clamping device, substantially as and for the purpose specified.

In testimony whereof, I have hereunto signed my name in the presence of two attesting witnesses, at Syracuse, in the county of Onondaga, in the State of New York, this 5th day of May, 1911.

GEORGE W. SPONABLE.

Witnesses:
GEO. C. CARHART,
CHAS. H. YOUNG.